June 19, 1928.  
J. J. N. VAN HAMERSVELD  
1,674,145  
WAY GUARD CONSTRUCTION FOR MACHINE TOOLS  
Filed Oct. 19, 1926  3 Sheets-Sheet 1
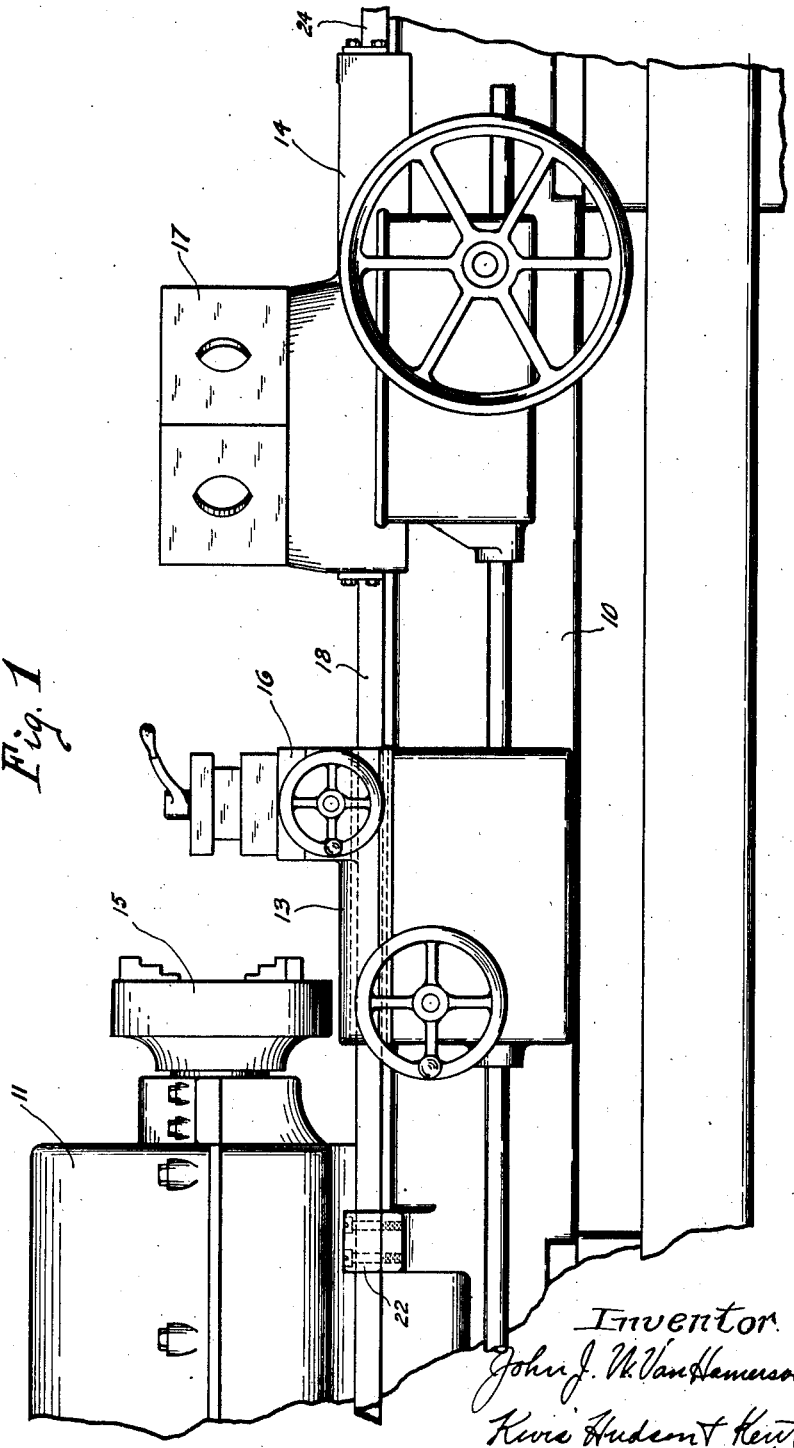

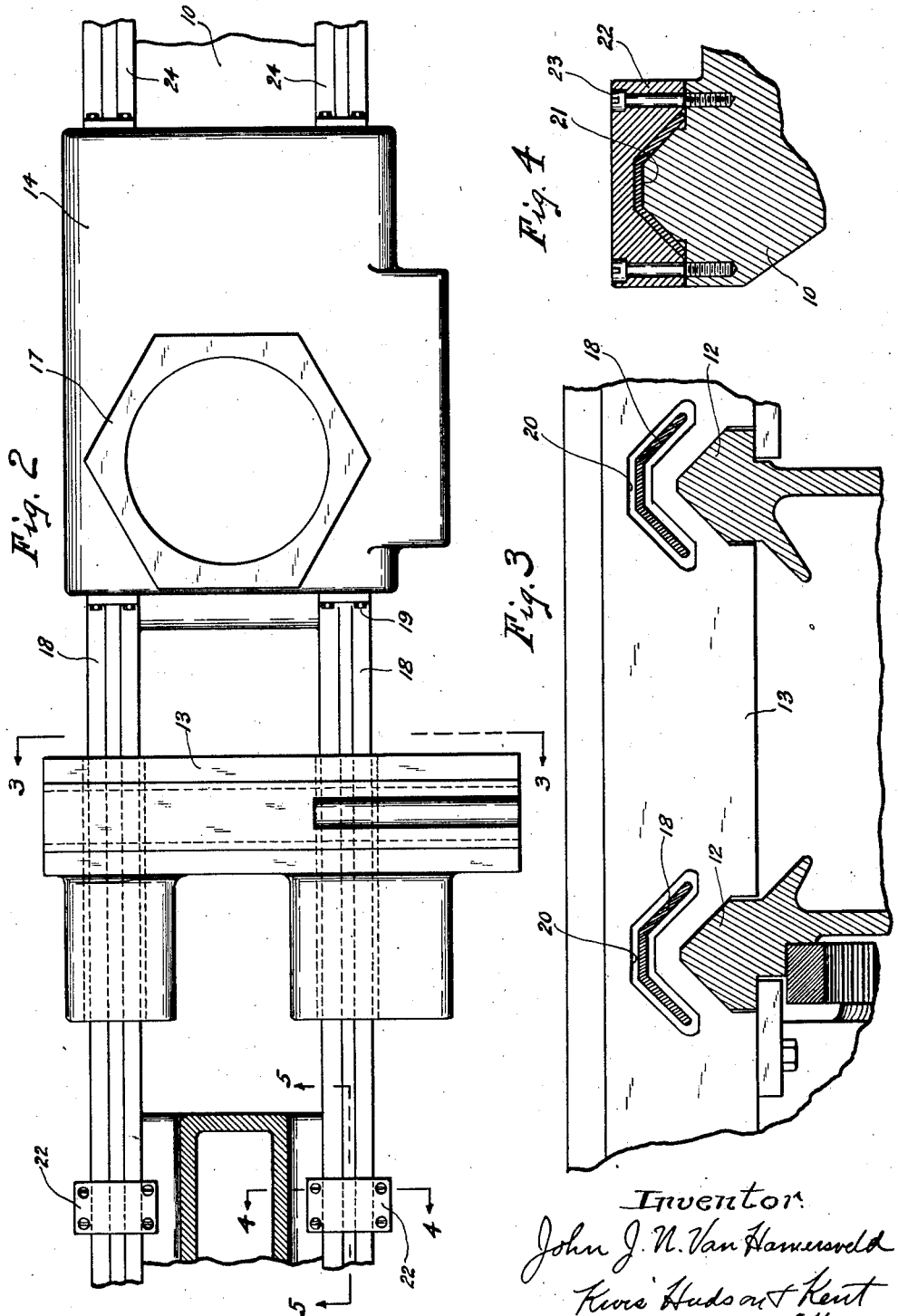

June 19, 1928.
J. J. N. VAN HAMERSVELD
1,674,145
WAY GUARD CONSTRUCTION FOR MACHINE TOOLS
Filed Oct. 19, 1926    3 Sheets-Sheet 3
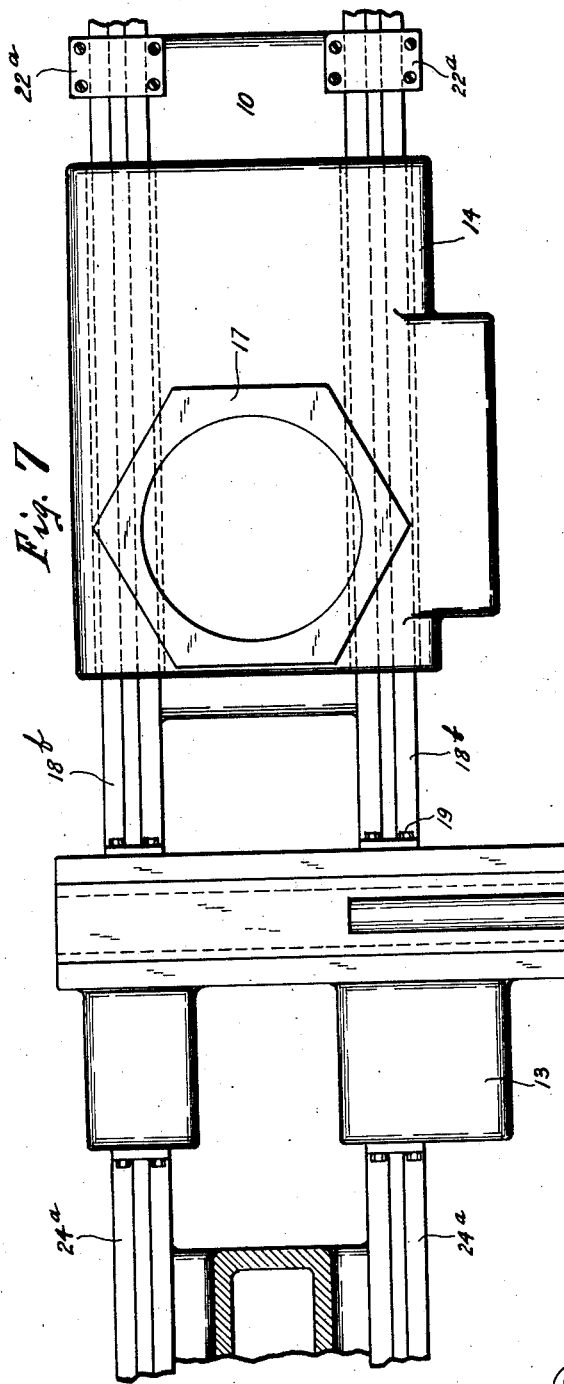
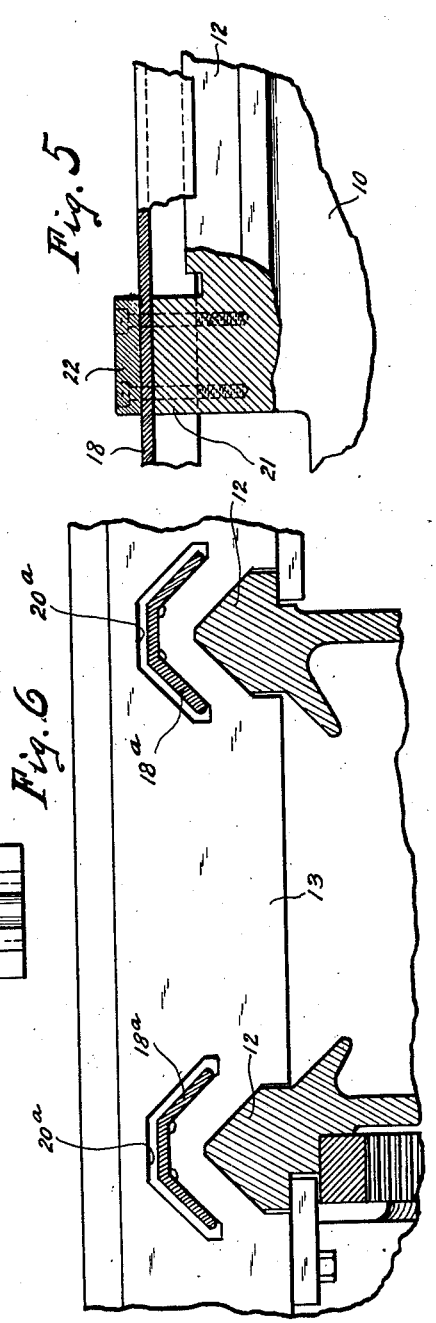

Patented June 19, 1928.

1,674,145

UNITED STATES PATENT OFFICE.

JOHN J. N. VAN HAMERSVELD, OF CLEVELAND HEIGHTS, OHIO, ASSIGNOR TO THE WARNER AND SWASEY COMPANY, OF CLEVELAND, OHIO, A CORPORATION OF OHIO.

WAY-GUARD CONSTRUCTION FOR MACHINE TOOLS.

Application filed October 19, 1926. Serial No. 142,718.

This invention relates to a way guard construction for machine tools having a plurality of sliding members supported on ways, at least one of which is common to the sliding members.

The present invention covers certain modifications of the constructions illustrated in U. S. Patent No. 1,575,735, granted in the names of E. P. Burrell and myself.

In the above mentioned patent, a guard is provided for one or more ways common to two sliding members which completely houses the way so as to effectively protect the way from chips, dirt, cutting compound and the like, as well as to protect it against injury from heavy falling objects.

The present construction, while it does not completely house the way, covers the same so as to protect it from injury by falling objects and gives some degree of protection against chips, dirt and the like. The advantages over the prior construction are simplicity and reduced cost.

The invention may be briefly summarized as consisting in certain novel details of construction and combinations and arrangements of parts which will be described in the specification and set forth in the appended claims.

In the accompanying sheets of drawings illustrating two embodiments and a slight modification of my invention in so far as the support of the way guard is concerned, Fig. 1 is a side view of the major portion of a turret lathe equipped with the invention; Fig. 2 is a plan view of the same with a portion of the head in section and omitting some of the parts unessential to the invention; Fig. 3 is a transverse sectional view substantially along the line 3—3 of Fig. 2 and on a slightly enlarged scale; Fig. 4 is a transverse sectional view substantially along the line 4—4 of Fig. 2 and on the same scale as Fig. 3; Fig. 5 is a fragmentary view, partly in section and partly in elevation, illustrating a portion of one of the ways and a portion of the associated guard as well as the guard support on the way or bed, the section being taken substantially along the line 5—5 of Fig. 2; Fig. 6 is a view similar to Fig. 3 illustrating a modification in the manner in which the way guard is supported; and Fig. 7 is a view similar to Fig. 2 showing a modification in the arrangement of the guards with respect to the sliding members.

Referring now to the drawings, 10 represents the bed of the lathe which is provided with a head 11 and ways 12 to accommodate the cross slide carriage 13 and turret saddle 14. The head will be provided with the usual spindle which, in this case, is provided with a rotating work holding chuck 15, and the cross slide carriage and turret saddle will be provided respectively with a suitable cross slide and a turret designated 16 and 17. The operating mechanism for the cross slide carriage and turret saddle need not be described as my invention does not involve these particular parts.

It will be observed that V-shaped ways are here illustrated, one way being provided along the front side of the bed and the other along the rear side, but the ways may be flat or otherwise shaped. In this instance, both sliding members 13 and 14 are supported on both ways. This is not essential, however, as the cross slide carriage need not be supported on the rear way for in some instances it may be supported on the front way 12 and on a separate way along the lower front side of the bed, as clearly illustrated in the Burrell and Van Hamersveld patent previously referred to. In other words, it is immaterial to my invention whether the two sliding members 13 and 14 have two common ways or one common way.

It is a feature of the present invention that one of the sliding members 13 or 14 is provided with a guard which projects over the way which is common to the two sliding members or with two such guards projecting over both ways if both ways are common to both sliding members, the guard being attached to one sliding member projecting freely through the other sliding member and having a support on the way or bed beyond the sliding member through which the guard extends. It is immaterial whether the guard referred to is attached to the turret saddle, in which event it will extend through the cross slide carriage and will be supported on the way or bed forwardly of the cross slide carriage, or whether the guard is attached to the cross slide carriage and extend rearwardly through the turret saddle and has a support on the way or bed rearwardly of the turret saddle. Furthermore, the sliding member through which the guard extends may also support the guard supplementing the support given by the way or bed. On the other hand, the guard may extend freely through the sliding member without having a support thereon.

In Figs. 1 and 2 I have illustrated the guards for the common ways 12 attached to the turret saddle and projecting forwardly through the cross slide carriage, these guards being illustrated at 18, and being shown as attached to the forward face of the saddle by screws 19. It will be observed that these guards extend over the ways and conform somewhat to the shape of the top thereof, and, additionally, that they extend through correspondingly shaped openings 20 in the cross slide carriage arranged a suitable distance above the ways so as to leave sufficient metal between these openings and the ways so that the cross slide carriage will be properly supported. These guards are preferably stamped from a suitable gauge of sheet metal.

It will be observed that the guards extend forwardly beyond the cross slide carriage alongside the head 11 and that forwardly of the carriage and at both sides of the head they are supported by the bed and, in fact, on supporting portions 21 of the ways, these supporting portions having the same contour as the ways but being elevated above the way surface, as clearly indicated in Fig. 5. It is desirable that the guards be supported at this point not only against downward pressure but against a thrust upward, and, accordingly, supporting caps 22 are secured by screws 23 to the bed alongside the guard supports 21, as clearly shown in Fig. 4. The under sides of the caps 22 conform to the shape of the guards and the parts 21 and 22 form in effect a guard support having a slot conforming to the shape of the guard which has sliding and supporting contact with both upper and lower walls thereof. I do not regard it essential that the guard support be composed of two parts 21 and 22, as it may be formed of one part with a suitably shaped slot cast or machined therein, but for convenience of manufacture a two part support is preferable.

It will be understood that the guards 18 are long enough to extend through the front guard supports when the saddle 14 is in its rearmost position, and in Figs. 1 and 2 the guards are shown extending beyond these supports as the saddle is represented as forwardly of its rearmost position.

In Fig. 3 the guards extend through the cross slide carriage without any supporting relation with the cross slide carriage, but it may be desirable to supplement the supporting action obtained by the attachement to the turret saddle and by the front supports 21 and 22 by forming openings through the cross slide carriage in such a way that the guards will have a support in and sliding engagement with the cross slide carriage. This is illustrated in Fig. 6 where the guards are designated $18^a$ and the openings for these guards are designated $20^a$. If the guards have a support on the cross slide carriage where they extend through the same, they may have a sliding fit similar to that shown in Fig. 4, but inasmuch as the intermediate portions of the guard members are not likely to be subjected to any upward thrust, I regard it as sufficient if the lower sides of the guard members have sliding engagement with the cross slide carriage and that the upper sides of the guard members be clear of the top walls of the slots $20^a$, and that construction is illustrated in Fig. 6.

The rear end of the saddle may, if desired, be provided with guards such as indicated at 24, but these involve no particular problem either in their form or in their manner of support since they are of no considerable length and do not extend through a sliding member.

As before stated, the guards just referred to may be attached to the cross slide carriage in which event they will extend through the turret saddle either as illustrated in Fig. 3 or Fig. 6 and will have a support identical with that shown in Fig. 4 beyond or rearwardly of the saddle. This is illustrated in Fig. 7, which shows guards $18^b$ attached to the rear side of the cross slide carriage and extending through the turret saddle and over supports identical with the supports 21 shown in Figs. 4 and 5 but provided on the ways at the rear of the bed, and under caps $22^a$ identical with the caps 22 of the first described construction.

In place of the guards 24 shown in Fig. 2 as projecting rearwardly from the rear end of the turret saddle, guards $24^a$ will be provided on the front side of the cross slide carriage and will project forwardly therefrom over the ways.

While I have shown the preferred construction and certain modifications, I do not desire to be confined to the precise details and arrangements shown but aim in my claims to cover all modifications which do not involve a departure from the spirit and scope of my invention.

Having thus described my invention, I claim:

1. In a machine tool, a bed having ways, a plurality of members slidingly supported on the ways, at least one of the ways being common to said sliding members, and a guard for the common way secured to one sliding member and extending through another sliding member and having sliding supporting engagement on an elevated portion of the way or bed beyond said last-mentioned sliding member.

2. In a machine tool, a bed having ways thereon, silding members supported on said ways, at least one way being common to said members, a guard for the common way attached to one sliding member, a support on the bed in line with said way for said guard, said guard having sliding engagement with said support and extending through an opening therein and also extending through an opening in a sliding member between said support and the sliding member to which the guard is attached.

In testimony whereof, I hereunto affix my signature.

JOHN J. N. VAN HAMERSVELD.